Figure 2:
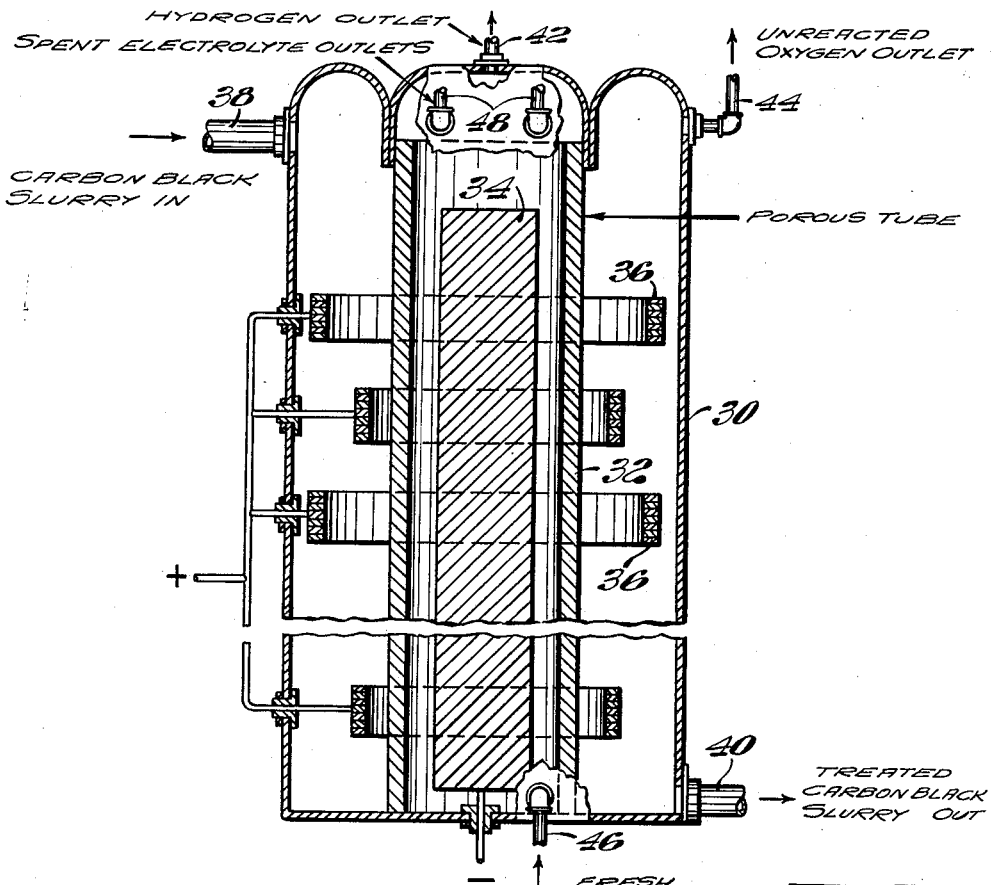

Sept. 24, 1957  R. ANTONSEN  2,807,577
ELECTROLYTIC AFTER TREATMENT OF CARBON BLACK
Filed April 25, 1956

INVENTOR.
RANDOLPH ANTONSEN
BY
Kenneth W. Brown, Atty

United States Patent Office
2,807,577
Patented Sept. 24, 1957

2,807,577
ELECTROLYTIC AFTER TREATMENT OF CARBON BLACK

Randolph Antonsen, Boston, Mass., assignor to Godfrey L. Cabot, Inc., Boston, Mass., a corporation of Massachusetts Application April 25, 1956, Serial No. 580,608

5 Claims. (Cl. 204—130)

This invention relates to a novel process for treating carbon black to alter the chemical nature of its surface and improve its compatibility with various vehicles. Depending upon the exact nature of the chemical change introduced, carbon black treated according to this invention can be rendered more useful for various systems such as inks, protective coatings, plastics, elastomers, etc.

The chemical treatment of carbon black to modify the surface characteristics thereof is a well established practice in the art. For example, numerous processes for increasing the oxygen content of carbon blacks are known, typical of which are the processes of U. S. Patents, No. Re. 19,664, Damon, No. 2,420,810, Bray et al., and No. 2,686,107, Jordan. There is nothing wrong with the processes of those patents. However, the process of this invention is a definite improvement thereover in that the oxygen content of the black can be increased without the inevitable loss of product which occurs with hot air oxidation (Damon) and without the addition of acidic complexes which must be removed from the treated product (Bray et al., Jordan). Furthermore, no substantial increase in surface area of the black results from the present process as it does in the case of other higher temperature oxidation processes. All of these differences are significant as illustrating the economic advantages of the present process. The present process is equally desirable as a method of increasing the sulfur content of blacks or adding other complexes besides oxygen complexes to carbon black, particularly because it can be carried out at temperatures so much lower than those required when straight chemical reaction is relied upon.

It is the principal object of this invention to provide a new and improved process for increasing the amount of oxygen, sulfur or other chemical complexes on carbon black without heating the black and with greater efficiency and economy than in methods used heretofore.

It is another object of this invention to provide such a process in which the carbon black is treated in an aqueous medium.

Another object is to provide such a process in which the oxygen, and/or sulfur or other complexes are added to the carbon black by electrolytic means.

Another object is to provide such a process in which the extent of the change in properties of the carbon black can be carefully controlled and by which the chemical nature and activity of the black can be adjusted independently while other properties are not substantially affected.

The process of my invention comprises exposing carbon black while suspended in an aqueous medium to the effects of an aqueous electrolysis reaction occurring around the positive electrode of an electrolytic cell the electrolyte in which likewise consists of an aqueous medium. In my process the aqueous carbon black slurry is maintained in direct contact with the anode of the electrolytic cell but is completely isolated from the cathode by means of a porous membrane which is permeable to water and substances dissolved therein but substantially impermeable to the suspended black.

Whenever an aqueous medium is electrolyzed, some of the water is always split into its components, hydrogen being evolved at the cathode and oxygen at the anode. When tap water or similar very dilute but slightly conductive aqueous media are used, this electrolytic decomposition of $H_2O$ is the only significant reaction involved. However, in order to obtain higher current density and effect greater and more rapid changes in the carbon black being treated, it is usually advisable to employ as the electrolyte a relatively dilute aqueous solution of a strongly ionizing substance. Although salts may be used for this purpose, free acids and bases such as $H_2SO_4$ and NaOH are decidedly preferred in order to simplify recovery of a carbon black product uncontaminated by the presence of salt deposits, etc. Especially preferred as the electrolyte are aqueous solutions chosen from the group consisting of about 0.5 to 5 normal solutions of an alkali metal hydroxide and about 0.5 to 5 normal solutions of inorganic acids which are not peracids but which have oxygen containing anions.

The extent to which the surface and other characteristics of the carbon black is changed depends, for a given electrolyte, largely upon the amount of oxygen and/or other complexes added to the black. This, for a given physical set up (i. e. electrode type, area and spacing, etc., the amount of slurry and concentration of black therein, its degree of dispersion and method of agitation, circulation, etc.) depends almost directly upon the amount of current passed through the cell. A close and accurate method of control is very simply provided in the present process, therefore. The smaller the area of the anode relative to the volume of the anode section of the electrolytic cell, the more important the agitation and mixing of the carbon black slurry becomes. In order to effect significant improvements in surface characteristics of the blacks treated, the current density and time of exposure of the slurry thereto should be sufficient to produce at least about 0.002 faraday of electricity per gram of black and preferably not less than 0.005 faraday per gram of black.

The concentration of the carbon black in the slurry treated is not particularly critical so long as it is not so great as to produce a slurry which is too heavy and viscous to be mixed or handled properly. Slurries containing about 5 to 25% carbon black by weight are generally suitable and with certain blacks even higher concentrations can be used while still maintaining adequate fluidity, especially with the aid of wetting agents and other viscosity modifiers.

For certain uses, such as in rubber latices or similar polymer suspensions the treated black may be used wet, either in the slurry form in which it is produced or after filtration, washing or partial concentration, etc., or it can be recovered as a substantially dry product, e. g. by spray drying, or by centrifuging or filtration followed by regular drying or vacuum drying etc.

Figure 1:
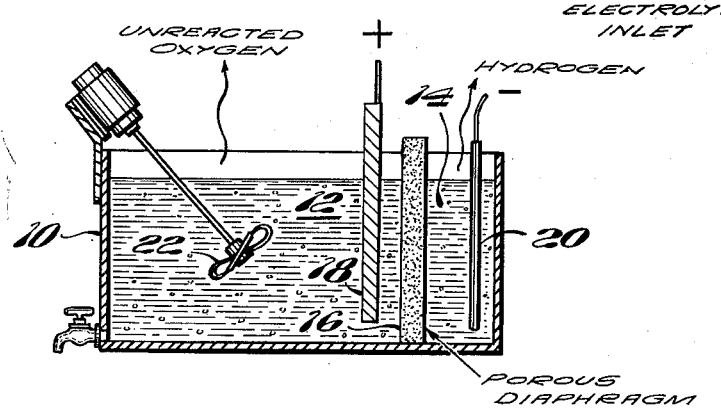

Apparatus in which the process of my invention may advantageously be carried out is illustrated in the accompanying drawings, in which Fig. 1 is a view in vertical cross section of an electrolytic cell adapted for a batch process and Fig. 2 is a view in vertical cross section of a cell organized for continuous operation.

Referring to Fig. 1, the cell 10, constructed of or lined with a suitable nonconductive material, is separated into two sections or zones 12 and 14 by means of a porous diaphragm 16. This diaphragm may be constructed of any suitable nonconductive semipermeable material as frited glass or silica, or asbestos or glass fiber matrices. The larger section 12 is provided with positive electrode 18 while negative electrode 20 is positioned in the smaller section 14. These electrodes should be of plate form or similar geometric shape so as to present as large an area as possible in order to aid the passage of current. Moreover, they should be spaced so they are perfectly flat and parallel to one another. These electrodes may be fashioned of any functional conductive material such as graphite or various metals such as platinum, copper, lead and nickel. The particular material chosen will depend to some extent on the nature of the electrolyte, platinum, nickel and carbon or graphite being good in alkaline medium while copper, lead and carbon electrodes are suitable in acid electrolytes. A stirrer 22 is provided to agitate the slurry and thus to ensure uniform exposure of all the carbon black particles to the reactions taking place in the cathode cell.

The apparatus of Fig. 2 is designed for continuous operation and hence will probably be preferred for most installations. Here cell 30 is preferably cylindrical in shape and is equipped with a concentrically disposed porous diaphragm 32.

The negative electrode 34 is mounted within the diaphragm tube and a plurality of ring electrodes 36 are secured within the annular zone of the cell and spaced apart along its length. Carbon black slurry is admitted to the annular zone of the cell through pipe 38, preferably in a tangential direction around the concentrically placed porous diaphragm, and is withdrawn at the opposite end of the cell through pipe 40. Outlets 42 and 44 are provided for release of hydrogen and unreacted oxygen respectively. Fresh aqueous electrolyte may be added to the cell by means of inlet pipe 46 while spent electrolyte and impurities are withdrawn through pipes 48.

The following specific examples are given in order to demonstrate fully the practical operation of our invention:

*Example I*

In a glass tank about 5¾″ long and 3″ wide were mounted in vertical position a flat strip of platinum 1.5 cm. wide and parallel and directly facing same, a flat nickel strip about 3.8 cm. wide. The nickel strip was positioned inside of a porous cylindrical cup which formed a chamber separate from the remainder of the tank. The nickel strip was connected to the negative side of a D. C. generator and the platinum strip was connected through 2 rheostats in series to the positive side of the same generator.

About 200 grams of an aqueous carbon black slurry containing 15% by weight of a channel type carbon black were placed in the anode compartment and while agitating said slurry with a propeller type stirrer about 78 grams of 53% NaOH solution were introduced into the cathode compartment (equivalent to 4 N NaOH solution after diffusion into all the water in the carbon black slurry).

The D. C. generator was turned on and by regulation of the rheostats and the occasional addition of fresh water to make up for that lost by evaporation (operating temperature reaches equilibrium at about 120° F.), a direct current of about 6 amperes was maintained through the electrolytic cell for about 3½ hours ($\simeq$ to about 0.025 faraday/gram of black).

Analysis of the black after being recovered from the above slurry by filtration, washing and drying showed an oxygen content of about 13% by weight compared to an initial oxygen content of the untreated black of about 5% by weight for the original black as produced and about 6% by weight for the control on the same black after being dispersed in water to form a 15% slurry and then recovered by filtration, washing and drying in the same maner in which the treated black was recovered. The black treated by the electrolysis reaction exhibited greatly improved flow properties making it especially suitable for use in lithographic and carbon paper inks, etc.

*Example II*

In another run made in the above apparatus using a similar physical arrangement but treating a black in the form of an aqueous slurry containing 23% by weight of black, the passage of a 6.0 amp. current for 1 hour ($\simeq$ to about 0.015 faraday/gram of black) increased the volatile content of the black by about 2% by weight over and above that of a control black subjected to the same treatment except for the electrolysis reactions.

The above examples are given for purposes of illustration only and countless variations and substitutions may obviously be used. For example, sulfuric acid solutions can be used as the electrolyte in place of the sodium hydroxide used above. However, if 4N sulfuric acid is used, the complexes added to the carbon black by the electrolysis reactions generally consist not merely of oxygen but of both sulfur and oxygen. Blacks modified in this way are of value principally as fillers for use in rubbers, especially those produced by vulcanization. It has been found that, in order to introduce predominantly oxygen complexes on the surface of the carbon black, the concentration of the sulfuric acid used as electrolyte should be less than about 1N.

Similarly, in place of solid plate or sheet electrodes, there may be used perforated plates or wire gauzes and similar partially open sheet-form electrodes. These permit better circulation of the carbon black slurry during treatment and offer particular advantages on larger scale operations, especially when it is desired to employ the full cross-section of the electrolysis tank for conduction of current.

Having described my invention and preferred embodiments thereof, what I desire to claim and secure by U. S. Letters Patent is:

1. A process for improving the surface characteristics of carbon black which comprises subjecting the carbon black while in an aqueous suspension in contact with the positive electrode of a direct current activated electrolytic cell and out of contact with the negative electrode therein to the passage of at least 0.002 faraday of direct current per gram of black through the aqueous electrolyte between said electrodes, and then recovering the modified black.

2. A process for increasing the volatile content of carbon black which consists in exposing a conductive slurry of the carbon black in a direct current energized electrolytic cell to the electrolytic reactions occurring at the positive electrode in said cell while maintaining said slurry out of contact with the negative electrode therein, thereby adsorbing oxygen complexes onto the surfaces of the carbon black particles, and removing said black from said cell after sufficient exposure to achieve the desired amount of volatile addition to the black.

3. A process for oxidizing carbon black which comprises flowing direct current electricity across the electrodes of a cell divided by a porous diaphragm into a positive and a negative zone and containing a dilute solution of an electrolyte and passing an aqueous slurry of carbon black through the positive zone of said cell at such a rate that the carbon black therein is subjected to an average flow of at least 0.005 faraday of direct current per gram of carbon black.

4. A process for increasing the volatile content of carbon black which comprises providing a body of fluid electrolyte in an electrolytic cell divided into an anodic and a cathodic zone by means permeable to fluids but not to solids, suspending carbon black in the electrolyte in the anodic zone, flowing at least 0.002 faraday of direct current per gram of carbon black through the electrolyte from the cathodic to the anodic zone, thereby releasing nascent oxygen and oxygen complexes of elements contained therein and adsorbing same on the surfaces of the carbon black, and recovering the carbon black thus treated from the cell.

5. A process for increasing the volatile content of carbon black which comprises continuously flowing a slurry of carbon black in an electrolyte through the anodic zone of an electrolytic cell and electrolyte free of carbon black through the cathodic zone of said cell, said zones being in communication with one another solely by solids-free electrolyte, flowing at least 0.002 faraday of direct current per gram of carbon black through the electrolyte from the cathodic to the anodic zone, thereby releasing oxygen from the electrolyte and depositing it upon the carbon black, and flowing the carbon black with its adsorbed oxygen from the cell.

References Cited in the file of this patent

UNITED STATES PATENTS

| | | |
|---|---|---|
| 1,062,431 | Billiter | May 20, 1913 |
| 1,314,632 | Bullock | Sept. 2, 1919 |